United States Patent [19]

MacLeod et al.

[11] Patent Number: 4,518,904
[45] Date of Patent: May 21, 1985

[54] STEPPER MOTOR CONTROL FOR DATA DISK SYSTEM

[75] Inventors: Nigel MacLeod, Glenrothes; David Ruxton, Crieff, both of Scotland

[73] Assignee: Rodime plc, Glenrothes, Scotland

[21] Appl. No.: 573,708

[22] Filed: Jan. 25, 1984

[51] Int. Cl.³ .......................................... H02K 29/04
[52] U.S. Cl. .................................. 318/685; 318/696; 360/78
[58] Field of Search .................. 318/696, 685; 360/78, 360/106

[56] References Cited

U.S. PATENT DOCUMENTS 4,215,302 7/1980 Chiang ................................ 318/696

Primary Examiner—B. Dobeck
Assistant Examiner—Saul M. Bergmann
Attorney, Agent, or Firm—Odin, Feldman & Pittleman

[57] ABSTRACT

A data disk storage system utilizing a bipolar stepper motor for use in conjunction with the controlling of the operation of the storage system. The stepper motor imparts a drive force for moving a control arm to which a read/write head is coupled. The operation of the stepper motor through driving of the control arm causes the read/write head to move across the various tracks of the data disk within the data storage system during operation of such system. The stepper motor includes a stator and a rotor coupled to an output shaft of the motor which output shaft in turn is coupled to the read/write head through the control arm. A first drive mechanism within the stepper motor generates a first phase signal within the stator for creating a first drive force for rotating a rotor. A second drive mechanism of the stepper motor generates a second phase signal within the stator for creating a second drive force for rotating the rotor. These first and second drive forces are out of phase with each other, normally by 90° when both signals are positive or both are negative or by multiples of 90° when one of the signals is positive and the other is negative. A control mechanism selectively provides positive and negative phase current signals to the first and second drive mechanisms for generating 8 stable step positions for the rotor during each motor cycle. This control mechanism controls the current supplied to the first and second drive mechanism so that the resulting holding torque on the rotor generated by the first and second drive mechanisms is substantially the same at each step position.

26 Claims, 23 Drawing Figures

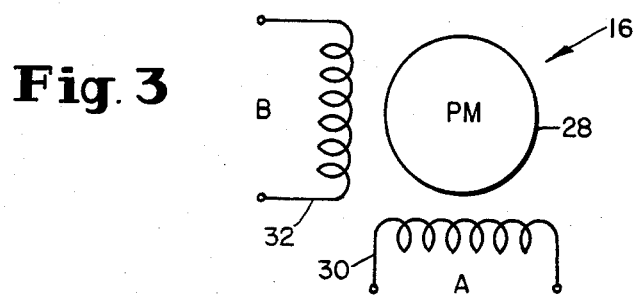
Fig. 3
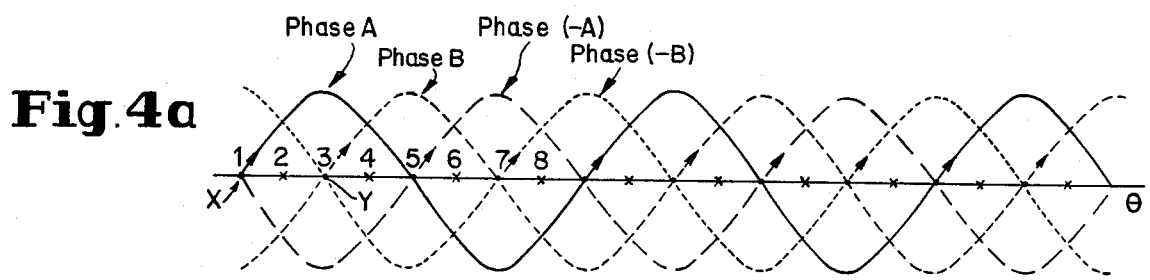
Fig. 4a
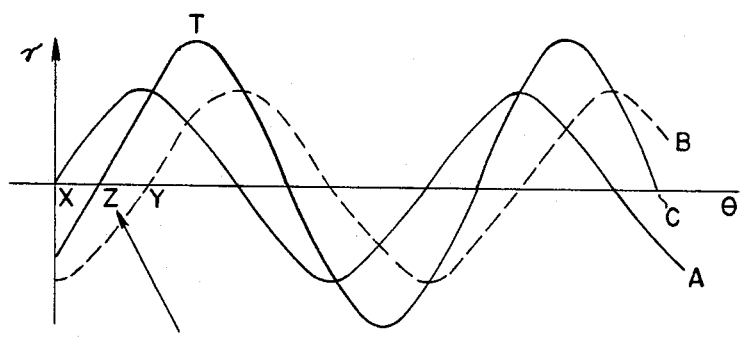
Fig. 4b
FULL STEP POS. (adopted when phases A+B are energised)
Fig. 4c
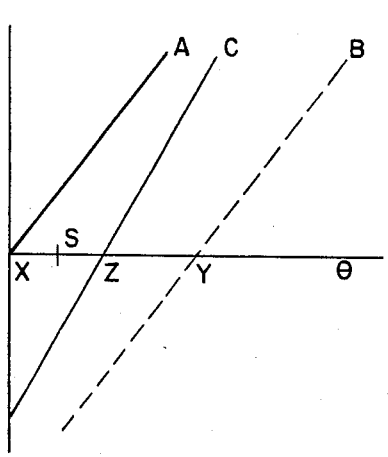
Fig. 4d
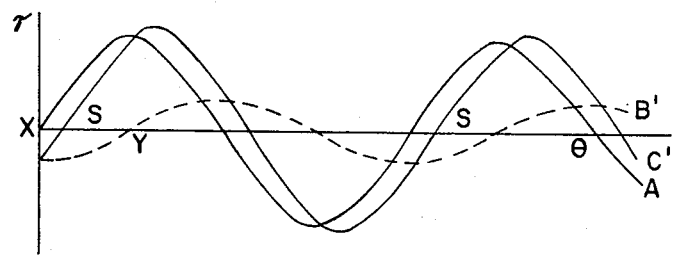
Fig. 4e
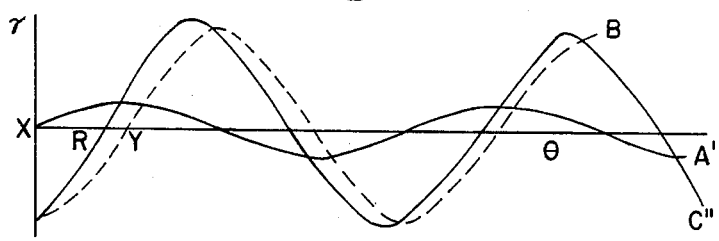

Fig.5a
Full step positions
(2 Phases on)
(2-2 Excitation)
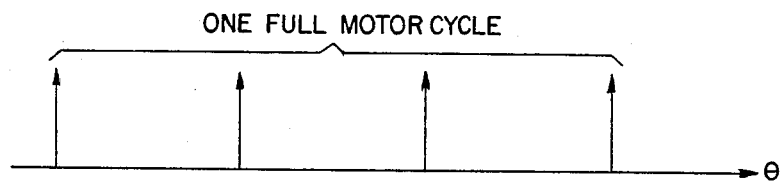
Fig.5b
Full +1/2 step positions
(1-2 Excitation)
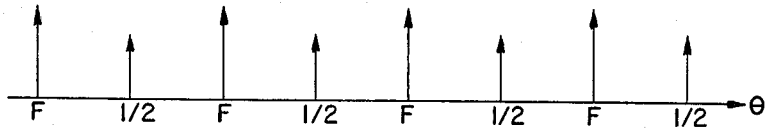
Fig.5c
1/4 +3/4 Step positions
(1 1/4 11/4 Step excitation)
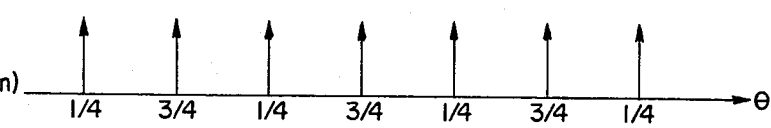
Fig.6a Full step mode
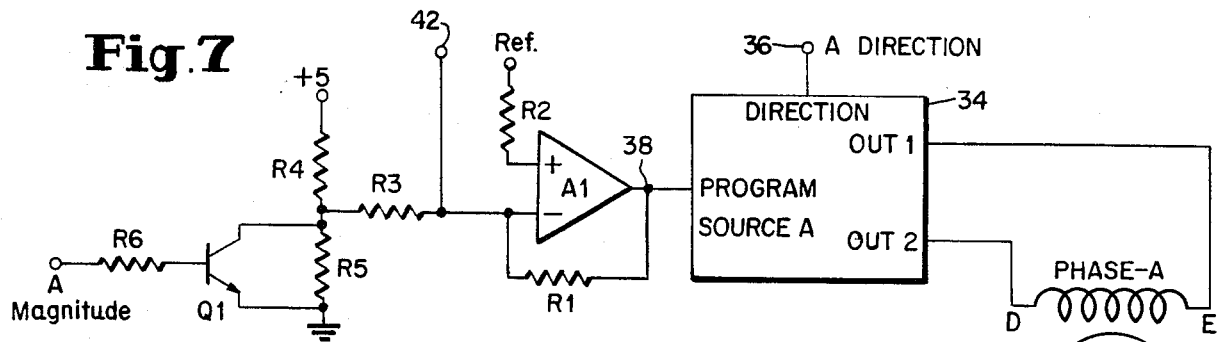
Fig.6b Half step mode
Fig.6c 1/4 Step mode
Fig.7
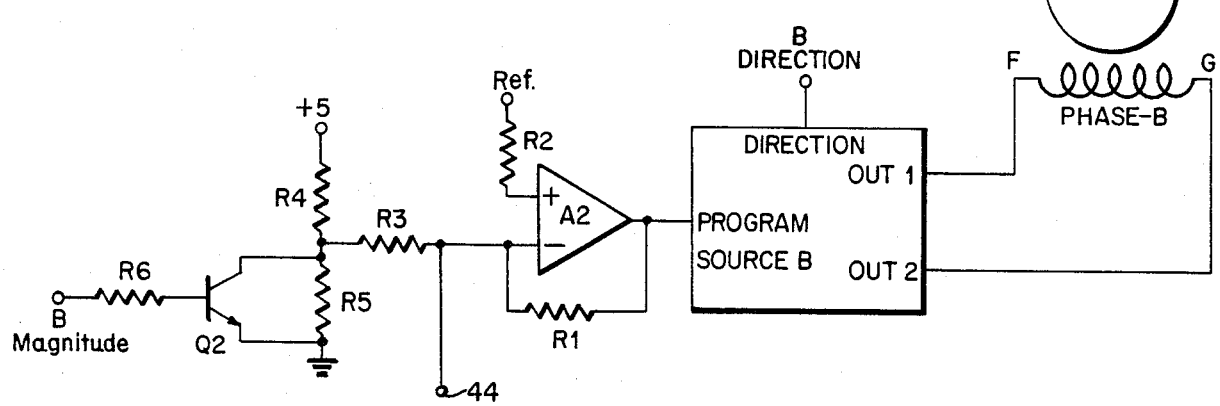

STEPPER MOTOR CONTROL FOR DATA DISK SYSTEM

BACKGROUND OF THE INVENTION

The present invention relates to a data disk storage system utilizing a stepper motor for controlling the movement of a read/write head across the tracks of the data disk.

In the operation of stepper motors, otherwise sometimes referred to as impulse motors, the rotor of the motor is incrementally moved through a series of discrete movements or steps as a result of a corresponding number of discrete changes in the energization of the windings of the stator of the motor. By varying the current supplied to the stator of the motor, an incremental drive force is generated for driving the rotor in the series of incremental steps. The energy supplied to the stator windings creates an internal magnetic field which generates a torque that urges the rotor to assume a mechanical position in line with the resultant magnetic field. By changing the energization current supplied to the windings of the stator in sequential step-by-step fashion the magnetic field is caused to move in a similar step-by-step fashion thereby resulting in the incremental step-by-step movement of the rotor. In a simple motor, one full rotation of the rotor may result from 360 electrical degrees of rotation with 4 steps being required to achieve such rotation.

In a conventional 2-phase permanent magnet or hybrid stepper motor used in conjunction with disk drive systems, a control mechanism commonly has been utilized for doubling the possible number of discrete positions or steps, that the output shaft can adopt. This doubling operation is accomplished by alternately passing current through both windings simultaneously and then through only one winding. The angle through which the motor shaft moves for each of these current changes is equal to one half of one motor step. Examples of such half step control systems are disclosed in U.S. Pat. Nos. 3,077,555 to Fredrickson and No. 3,746,958 to Leenhouts.

While this technique provides a simple way of increasing the resolution, i.e. number of steps during each cycle of the stepper motor, it causes the following disadvantages:

(a) The holding torque on the control arm, for insuring that the read/write head is properly aligned with a selected data track, in the "half step" position is reduced because of the lower total quantity of current being supplied to the motor. (In the half step position only one winding is energized.) As a result, the step accuracy is poorer in the half step position since less torque is available to overcome frictional forces. In addition, the decrease in stiffness, i.e. holding torque, reduces the resistance of the rotor to movement under conditions of shock and vibration.

(b) The accuracy of the motor cannot be controlled by the driving circuit in this half step position since any change of motor current in the half step will result in movement of the rotor but not in any change in the holding torque and stiffness.

While these disadvantages may be tolerable in some situations, they result in undesirable positioning problems in high performance applications. These problems become even more significant when seeking to minimize the separation between data tracks in a high density data storage system.

Numerous other stepper motor control systems have been developed primarily for increasing the number of steps within each motor cycle and additionally some attempt has been made for developing sophisticated control systems for overcoming the problems associated with the unequal torque applied to the rotor during the stepping operation. Exemplary of such developments are the various stepper motor control systems disclosed in those U.S. patents discussed below.

U.S. Pat. No. 3,445,741 to Gerber discloses a stepper motor in which each full step is broken down into a large number of smaller or fractional steps by varying the energization of the stator winding between a number of levels, which includes one or more levels in addition to 0,+1 unit levels. The control unit utilized in conjunction with the stepper motor disclosed by this patent to Gerber controls the current flowing through each of the stator windings for providing the additional current level.

U.S. Pat. No. 3,800,206 to Hinachi et al. discloses a drive control system for a 4-phase stepping motor. In the operation of the system disclosed in the patent to Hinachi et al. the number of steps for the rotor is increased by alternately energizing one coil and then a pair of coils of the stator windings. Uniformity of the resulting torque which would be inherent with such an energization system is avoided by increasing the exciting current during a time when one phase coil along is excited so as to be larger than the exciting current per phase during a time when 2-phase coils are excited.

U.S. Pat. No. 3,728,598 to May discloses a stepper motor having stator windings connected into two phases, with the stepper motor being advanced one step by reversing the direction of current in one of the phases. An energization circuit for this stepper motor continually energizes both portions of the windings so as to enable the available torque of the motor to be increased for at least the lower stepping speeds without increasing the losses in the motor.

U.S. Pat. No. 3,787,727 to McSparran discloses a half step stepper motor control system in which the acceleration and deceleration periods are held constant independent of the starting and stopping operations of the first and second phase energization signals. As pointed out by this patent, it is desirable to operate a motor in a half step manner in order to achieve twice the number of stable step positions. However, during such half step operation the torque applied to the motor varies in accordance with whether one or two windings are energized. The acceleration imparted to the rotor during the stepping operation will vary as a result of the number of windings energized and these different starting conditions will result in different lengths of time for the motor to arrive at its normal running speed unless appropriate steps are taken. Similar problems occur in connection with the deceleration of the half step operation of the stepper motor. The problems of start-up caused by the variation in torque in the stepper motor is compensated for in accordance with the disclosure of this patent by varying the current in the motor windings during start-up dependent upon whether it starts in 1-phase or 2-phase and the problems of stopping the motor caused by variation in torque is compensated for by changing the rate of the step pulses as well as the current amplitude in the windings during the stopping time dependent upon whether the motor is to stop in 1-phase or 2-phase.

U.S. Pat. No. 3,885,210 to Burnett discloses a stepper motor having a plurality of windings that are energized in sequence in order to generate the desired stepping movement of the motor. The drive circuit varies the current flowing into each of the windings in incremental steps between 0 and a maximum value in order to produce equal incremental steps of the motor.

U.S. Pat. No. 4,087,732 and No. 4,140,956 to Pritchard disclose a control circuit for a stepper motor for rotating the rotor of the motor in such a manner so as to minimize motor resonance while not appreciably reducing the rotor torque at high speeds. In the operation of this stepper motor, all of the steps are of equal amplitude but at least one of the steps between the maximum and minimum levels has a duration which is unequal to that of another step. In order to meet the requirement of maintaining the motor steps of equal size and maintaining equal holding torque, at least two of the components of the motor's stator that induce the magnetic fields are continuously changed.

U.S. Pat. No. 4,283,672 to Throssell discloses a stepper motor drive for sequentially energizing the windings of the motor and having an adjustable feedback network for controlling the operation of the current supplied to the windings. The drive includes at least one generator with a staircase signal that has a multiplier fed by a reference signal and an output of a clocked binary counter. The adjustable feedback network combines a fraction of the output of the multiplier with a reference signal so that the output from the multiplier represents unequal steps of a staircase wave form. A switching network which is controlled by the counter applies the drive signals to the windings in accordance with the output of the multiplier.

SUMMARY OF THE INVENTION

An object of the present invention is to provide an improved stepper motor system used in conjunction with a data disk storage system for controlling the movement of a read/write head between the tracks on the data disk.

Another object of the present invention is to provide a control system for enhancing the performance of a stepper motor in a data disk storage system for maintaining the basic half step resolution of such stepper motor while avoiding the disadvantages associated with a conventional half stepping operation.

A further object of the present invention is to provide a control system in a data disk storage system for controlling the operation of the movement of the read/write head between each track of a data disk so as to optimize the spacing between such tracks and minimize the time for stepping the read/write head between the tracks for transfer of data from the disk.

Still another object of the present invention is to provide a control system which enables the accuracy of the movement of the read/write head between the tracks of a data disk to be improved as compared to the accuracy obtainable with half stepping conventional systems.

A still further object of the present invention is to provide a control system for use in a data disk system for controlling the operation of the movement of the read/write head between tracks so as to minimize the settling time for the read/write head to assume the desired track location and thereby to minimize the time delay before the read/write operation can be commenced.

These objectives are achieved in accordance with the present invention.

A bipolar stepper motor in accordance with the present invention is used in controlling the operation of a disk drive storage system for causing the movement of the read/write head across the various tracks on the data disk. The stepper motor creates a series of step movements for incrementally driving its output shaft which in turn is coupled to a control arm that is connected to the arm of the read/write head for stepping the read/write head across the tracks as the read/write head seeks the desired track location. The stepper motor includes a rotor and a stator with the rotor being coupled to the output shaft of the motor. A first drive mechanism generates a first phase signal within the stator for creating a first drive force for rotating the rotor. A second drive mechanism generates a second phase signal within the stator for creating a second drive force for rotating the rotor. These first and second drive forces are out of phase with each other by multiples of 90°. A control mechanism selectively provides positive and negative phase current signals to the first and second drive mechanisms for causing such drive mechanisms to generate 8 stable step positions for the rotor during each motor cycle. The control mechanism controls the current supplied to the first and second drive mechanism so that the resulting holding torque on the rotor generated by the first and second drive mechanisms is substantially the same at each step position.

The control mechanism of the stepper motor selectively supplies high and low current signals to the first and second drive mechanisms so that the resulting torque on the rotor at each step position is substantially the same. With this operation of the control mechanism stable quarter step positions are generated which quarter step positions lie between normal full step positions generated when the magnitude of both current signals are substantially identical and normal half step positions when one current is high and the other current is zero. These quarter step positions lie at 45° increments commencing at 22.5° of a full motor cycle.

The current supply mechanism of the control mechanism supplies a high current equal to X and a low current equal to $(R_a/R_b) X$ where $(R_a/R_b) < 1$. The ratio of $R_a/R_b$ is selected so as to optimize the separation between each step location of the read/write arm coupled to the output shaft of the rotor as the arm moves across the data disk. The current supply mechanism maintains the high and low currents and the relationship between such currents within predetermined limits so that the deviation between each actual step location of the read/write arm with the desired step location is minimized. These high and low currents are selectively provided to either the first or second windings of the stepper motor so as to generate the 8 stable step positions during each motor cycle for the stepper motor. In controlling the operation of the motor 4 control data bits are used for controlling the control mechanism so as to generate the 8 stable step positions. These 4 data bits are set forth below:

| Step Positions | Bit 3 | Bit 2 | Bit 1 | Bit 0 |
|---|---|---|---|---|
| 0 | 1 | 0 | 1 | 1 |
| 1 | 0 | 0 | 1 | 1 |
| 2 | 0 | 1 | 1 | 0 |

| Step Positions | Bit 3 | Bit 2 | Bit 1 | Bit 0 |
|---|---|---|---|---|
| 3 | 0 | 1 | 0 | 0 |
| 4 | 0 | 0 | 0 | 1 |
| 5 | 1 | 0 | 0 | 1 |
| 6 | 1 | 1 | 0 | 0 |
| 7 | 1 | 1 | 1 | 0 | where: data bit 3 sets the first phase current signal direction as positive or negative, data bit 2 sets the magnitude of the first phase current signal as high current or low current, data bit 1 sets the second phase current signal direction, and data bit 0 sets the magnitude of the second phase current signal as high current or low current.

In the preferred embodiment of the present invention, a feedback control mechanism can be included in the control mechanism for the stepper motor for providing error feedback signals that are responsive to variances in the velocity of the movement of the control arm that is coupled to the output shaft of the stepper motor. These control signals are used to assist in dampening any oscillation in the movement of the control arm as the stepper motor moves from its initial position to its final position during each drive operation, which drive operation can include a multiple number of steps or a single step movement. The current supply mechanism is coupled to the output of the feedback control mechanism so as to vary the current output of the current supply mechanism in response to an error feedback signal while maintaining substantial linearity of the output signal from the current supply mechanism.

The control mechanism for the stepper motor in accordance with the preferred embodiment of the present invention can include an adaptive settling mechanism for more accurately determining when oscillations of the read/write head have substantially ceased once the read/write head has reached the desired track during the seeking operation. For such purposes, a velocity detection mechanism is provided for detecting the movement of the control arm for providing an oscillating output signal at its output in response to such movement. A comparator coupled to the output of the velocity detection mechanism determines if the oscillating output velocity signal falls within preselected velocity signal limits. A timer compares the time period during which the oscillating output velocity signal falls within the preselected velocity signal limits with a preset time period and provides an output timing signal when the measured time period equals the preset time period. If the oscillating output signal exceeds the preselected velocity signal limits before the measured time period has equaled the preset time period then the timer is reinitiated so that a new time period can be measured. If the measured time period equals the preset time period then an output signal is provided indicating that the control arm is substantially at rest.

BRIEF DESCRIPTION OF THE DRAWINGS

FIG. 3 is a representational view of a bipolar stepper motor such as would be used in accordance with the present invention.

FIGS. 4a-4e are wave diagrams showing the torque applied to a rotor during half stepping operations as conventional in the art and quarter stepping operations in accordance with the present invention.

FIGS. 5a, 5b and 5c are pulse diagrams indicating the magnitude of the torque generated on the rotor during the stepping operation during conventional full step and half step operations and quarter step operations in accordance with the present invention.

FIGS. 6a, 6b and 6c illustrate the currents applied to phase coil A and phase coil B of the bipolar stepper motor during conventional full step and half step operations and a quarter step operation in accordance with the present invention.

FIG. 7 is a schematic circuit diagram of a circuit utilized in carrying out the quarter step operation in accordance with the present invention.

DETAILED DESCRIPTION OF THE PREFERRED EMBODIMENTS

Figure 1:
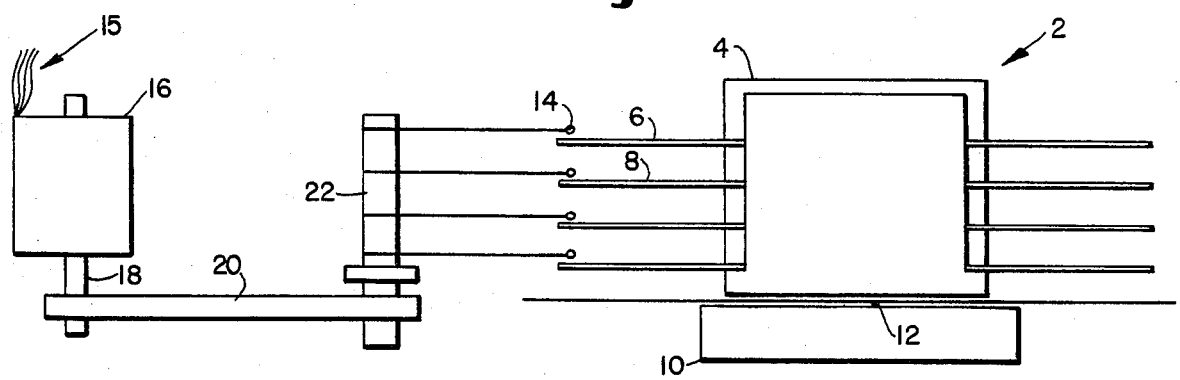
FIG. 1 is a representational side elevational view of a portion of a data disk storage system showing the interrelationship between the stepper motor and the read/write heads that are moved across a data disk of the storage system.

A data disk storage system in which the bipolar stepper motor control system of the present invention is used is shown in FIG. 1. The particular data disk system shown is a Winchester disk drive system 2 in which the disks such as disks 6 and 8 are mounted on a hub 4. Hub 4 in turn is mounted on a rotational drive member 12 coupled to and driven by a motor within base 10. A bipolar stepper motor 16 which receives input signals from a series of wires 15 has an output shaft 18 which is coupled for moving the read/write heads such as magnetic head 14 across the data tracks on the data disks.

Figure 2:
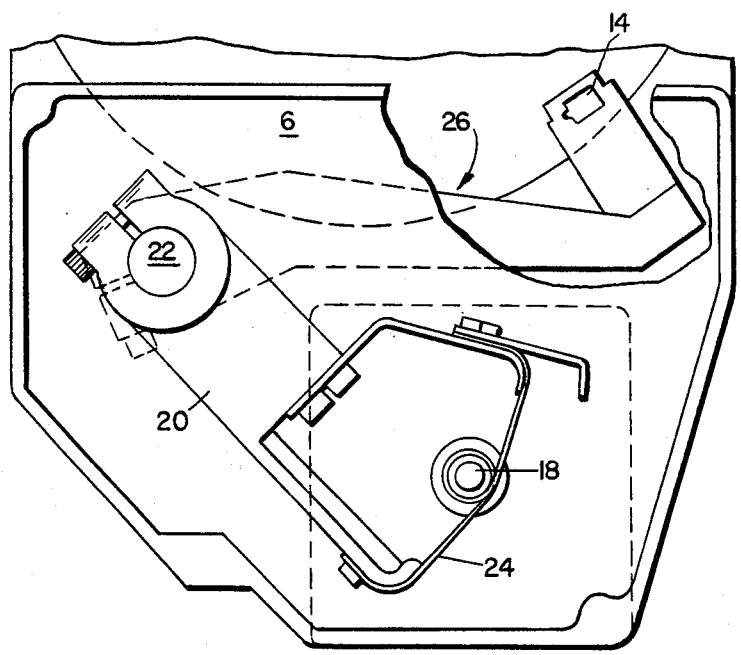
FIG. 2 is a top elevational view of a portion of a drive mechanism for controlling the movement of the read/write head between various tracks on the data disk.

Output shaft 18 is driven by the rotor of bipolar stepper motor 16 and this shaft rotates in incremental steps. As the motor output shaft rotates it imparts a linear motion to metal linking band 24, shown in FIG. 2, which is wrapped around shaft 18. Movement of the metal linking band in turn causes control drive arm 20 to be rotated about the axis of drive shaft 22. Movement of control drive arm 20 causes rotation of drive shaft 22 which in turn imparts a pivotal movement to arm 26 of the read/write head about the axis of drive shaft 22. Thus, arm 26 pivots about the axis of the drive shaft 22 thereby moving magnetic head 14 in and out along various tracks on data disk 6, which are shown in FIG. 2.

The bipolar stepper motor 16 includes a permanent magnet rotor 28 which is driven by the torque created by the magnetic fields generated by stator phase A winding 30 and stator phase B winding 32, shown in FIG. 3.

Turning to the wave diagrams shown in FIG. 4a, the application of the torque to permanent magnet 28 by stator windings 30 and 32 can be understood. The four curves in FIG. 4a represent the torque generated when positive and negative oscillating currents are applied to windings 30 and 32. The four curves are torque curves for phase +A, phase −A, phase +B and phase −B. Where are of the individual curves crosses the X axis in the positive going direction, a stable stationary rotary position is created. These points are shown by arrows in FIG. 4a. These stable positions as shown in this figure are those positions created when current is applied to only one of these stator phases windings of the motor. As shown in the figure, all of the arrows are equally spaced and accordingly each of the stationary step positions are equally separated from each other.

In general, the rotor 28 of motor 16 is moved a full step when phase A and phase B are both simultaneously on with each combination of sign. A motor is moved a half step when each of the full stepped positions is separated by a position in which the current is removed from one of the windings. Consequently, 8 stable steps are produced in the operation of a half step motor which stable steps occur at the following conditions:

| Step | Phase A | Phase B |
| --- | --- | --- |
| 1 | + | 0 |
| 2 | + | + |
| 3 | 0 | + |
| 4 | − | + |
| 5 | − | 0 |
| 6 | − | − |
| 7 | 0 | − |
| 8 | + | − | where "+" stands for plus V volts across winding of phase A or phase B, "−" stands for minus V volts across winding phase A or phase B, and "0" stands for winding phase A or phase B being switched off. In the operation of this system, positions 2, 4, 6 and 8 are full step detent positions and positions 1, 3, 5 and 7 are half step detent positions.

FIG. 5a shows four full step positions which represent one complete motor cycle ($\theta = 360°$ revolution) for a 2-phase bipolar stepper motor. In this mode of operation both motor windings (phase A and B shown in FIG. 3) are always energized simultaneously; the individual step positions are defined by the direction of current flow in the two windings, which current directions are shown in FIG. 6a. These step positions are essentially balance points where the torque generated by the 2-phase currents cancel out. The motor takes up a "full step" position when BOTH phases (A and B) are energized (see FIG. 6a).

Referring to FIG. 4a, which shows the torque/angle characteristic for each phase of a 2-phase motor, the positions 1 and 3 (X and Y) depict the step positions adopted when phase A or phase B respectively is energized (see FIG. 6b). These two step position are conventionally referred to as "half steps"; the slope of the torque curve at positions 1 and 3 (X and Y), see FIG. 4c, determine the stiffness at such step positions. The negative slope zero crossings represent imaginary step positions which are unstable. The 8 stable step positions occurring during one motor cycle with a half step operation are shown in FIG. 5b with the variance in the magnitude of arrow representing the difference in holding torque at each step position.

FIG. 4b shows the resultant torque/angle characteristic C for a full step which is generated by summing the individual A and B phase characteristics. From FIG. 4b, it can be seen that the full step stable position Z lies exactly in between the two half step positions X and Y. In addition, the full step holding torque at position T is significantly greater than the half step holding torque. This increase in holding torque results in an increase in stiffness at step location Z. Hence, entirely different behavior characteristics occur in the half and full step positions.

In accordance with the present invention, it has been found that most of the disadvantages created by the half step drive operation can be avoided if all of the motor step positions generate the same holding torque on the rotor, provided that the holding torque generated is higher than the conventional half step holding torque. This means that all step positions have the same stiffness and behave in exactly the same way. The bipolar stepper motor control system of the present invention provides a way of enhancing the performance of the stepper motor by maintaining the basic half step resolution while avoiding the disadvantages associated with conventional half stepping.

From FIG. 4b it can be seen that since the resultant torque curve C is a summation of the curves for phases A and B, by varying the magnitude only of curve A or curve B, the magnitude of the resulting holding torque curve C can be altered both in magnitude and also in position. This ability to vary curve C has been utilized in carrying out the present invention. Assume that characteristic of curve A remains the same; if the amplitude of curve B is reduced by reducing the current in that stator phase winding, then the zero crossing point of the resultant curve C can be moved between the full step position Z and the half step position X.

It has been found that by selecting a particular "low" amplitude of current for the current phase B, in this example, the stable zero crossing of the resultant sinusoidal curve C lies midway between the half step position X and the full step position Z. This zero crossing position is referred to herein as the "quarter step" position. FIG. 4c illustrates this position S. FIG. 4d shows how quarter step position S is generated. The resultant holding torque curve is curve C' which is formed by the summation of curve A and curve B'. Notice that the equilibrium point S lies one quarter of the distance between half step positions X and Y.

It also has been found that this low level of current in phase B which is used for generating the stable quarter step position S can be applied to phase A for a given stepper motor. Consequently, if the currents in phases A and B are interchanged (i.e. A is now the low current winding) then a new quarter step position is defined. This new stable quarter step position R is shown in FIG. 4e. The new step position R lies three quarters of the way between the original half step positions X and Y.

The above operations can be repeated except with the phase A current reversed, then the phase B current reversed, and then both currents reversed. These conditions form 8 unique stable step states, see FIG. 5c, which address every quarter step location in one full motor cycle. As shown in FIG. 5c, the resulting holding torque in each of the quarter step positions is the same. FIG. 6c shows the magnitudes and directions of the phase currents required to cause the stepper motor shaft to take up the 8 quarter step positions.

As a result the following objectives are achieved:
(a) Step positions are defined that are separated by one half step.
(b) Every step position requires the same total motor current and hence has the same resulting holding torque.
(c) The holding torque in the new step position exceeds that of the normal single phase half step position.

The circuit diagram shown in FIG. 7 contains a 2-phase stepper motor driven in the quarter step mode in accordance with the present invention by voltage programmable constant current sources. The operation of the phase A winding is described below (the operation of the phase B winding is identical).

The constant current source 34 for phase A has two input lines (a) direction input 36, which is a digital input, and (b) program input 38, which is an analog input signal. In the digital direction input 36, logic "1" specifies that the current will flow through the motor winding from D to E in phase winding A; logic "0" specifies the reverse direction. The analog program input defines the current level that is maintained in the stepper motor; 0 volts specifies zero current and +5 volts specifies normal (high) motor current.

Figure 8A:
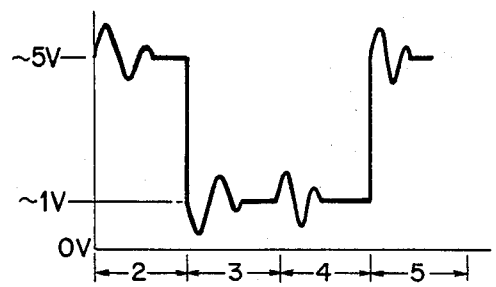
FIGS. 8a and 8b are voltage signal diagrams generated in a system utilizing a voltage feedback when the stepper motor is operated in a quarter step operation in accordance with the present invention and a conventional half step operation, respectively.

The direction input is driven from a microprocessor or suitable hardwired logic. The program input is driven by a times 1 inverting operational amplifier A1. The voltage seen by the input of amplifier A1 through resistor R3 at the junction of resistors R4 and R5 is either OV when the transistor Q1 is ON or (R5/(R4+R5)) *5 V when transistor Q1 is OFF. This latter voltage, when inverted with respect to the REF voltage (2.5 V) by the operational amplifier defines a low voltage of approximately 1 V at the program input 38 to the current source. In response to this low voltage at input 38, current source 34 generates a low current in the motor phase A winding. When Q1 is ON, the output of amplifier A1 is +5 V and the current source turns on normal (high) current. The output from amplifier A1 in the quarter step operation is shown in FIG. 8a, as further described below.

Thus a control circuit is provided for producing two distinct, defined currents in each motor phase winding; the high current being set by the current source itself and the low current being defined by the ratio R4/R5 from the resistors R4 and R5 that form a voltage divider. When the four logic inputs A and B for direction and program (magnitude) are driven in the sequence detailed in Table 1 below then the motor will step sequentially from quarter step to adjacent quarter step.

TABLE I

| Step Number | A-DIRECTION | A-MAGNITUDE | B-DIRECTION | B-MAGNITUDE |
|---|---|---|---|---|
| 1 | 1 | 0 | 1 | 1 |
| 2 | 0 | 0 | 1 | 1 |
| 3 | 0 | 1 | 1 | 0 |
| 4 | 0 | 1 | 0 | 0 |
| 5 | 0 | 0 | 0 | 1 |
| 6 | 1 | 0 | 0 | 1 |
| 7 | 1 | 1 | 0 | 0 |
| 8 | 1 | 1 | 1 | 0 |

In addition to the advantages already described, the quarter step method of stepper drive operation in the disk drive system is particularly advantageous in systems employing a velocity feedback signal to control the settling performance of the stepper motor. In this situation an error signal derived from a tachometer is summed together with the command signal to produce an actuating current signal to be supplied to the motor phase winding.

Figure 8B:
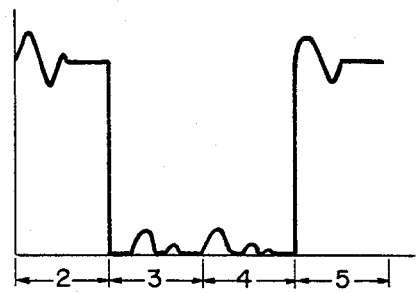

Referring to FIG. 7, error signals from a tacho/amplifier can be summed into the circuit at points 42 and 44. The form of the output from the operational amplifiers A1 and A2 is then essentially a digital signal with an analog voltage superimposed as shown in FIG. 8a. Since the current demand signal at the output of the operational amplifiers is always at least 1 V in the quarter step method of operation, the analog error signal can be added to such amplifier output signal for input into constant current source 34 and still remain within the linear range of operation of the constant current source 34. This linearity is maintained provided that the velocity error signal is less than +/− 1 V and assuming that the current sources continue to behave linearly for inputs greater than 5 V. In contrast in the half step mode of operation, the negative half cycles would be lost as the steady state current demand on one current source would be zero in the half step condition as shown in FIG. 8b. This introduces non-linearities into the feedback loop with the half step method of operation which prevents the velocity feedback system from operating correctly.

Another further advantage of the quarter step mode of operation is that the resistor combination Ra/Rb, here Ra=R4 and Rb=R5, (FIG. 7) can be selected so as to optimize step positioning for any specific stepper motor. This operation can be extended to replace the voltage divider of resistors R4 and R5 with a digital to analog converter or similar device driven by a microprocessor which has the optimum current level settings for every step programmed into its memory. Thus, it is possible to greately reduce errors in step positioning provided enough memory is available to store all the correction factors. In practice, correction factors only need be held for one full motor cycle as this cycle repeats itself every eight steps to within reasonable limits.

The quarter step mode of operation of a stepper motor with velocity feedback as described above has been implemented in a 5.25 inch computer peripheral disk drive system. The stepper motor is used for positioning the read/write heads over the desired data track on the data disk. The density of the data tracks that can be achieved is primarily a function of the resolution and accuracy of the stepper motor. The access time of the disk drive is determined by the maximum speed and acceleration of the stepper motor and by the settling time at the end of the seek operation in which the read/- write head is moved to the selected data track. Consequently, the stepper motor has a direct bearing on the two most important parameters of the operation of the disk drive system, i.e. capacity of the system and access time to data on the disk.

By utilizing the quarter step mode of operation according to the present invention, the accuracy of the stepper motor is maximized by making the stiffness of the stepper motor the same for all step positions and the settling time of the read/write head is minimized by using velocity feedback on the final motor step.

Figure 9:
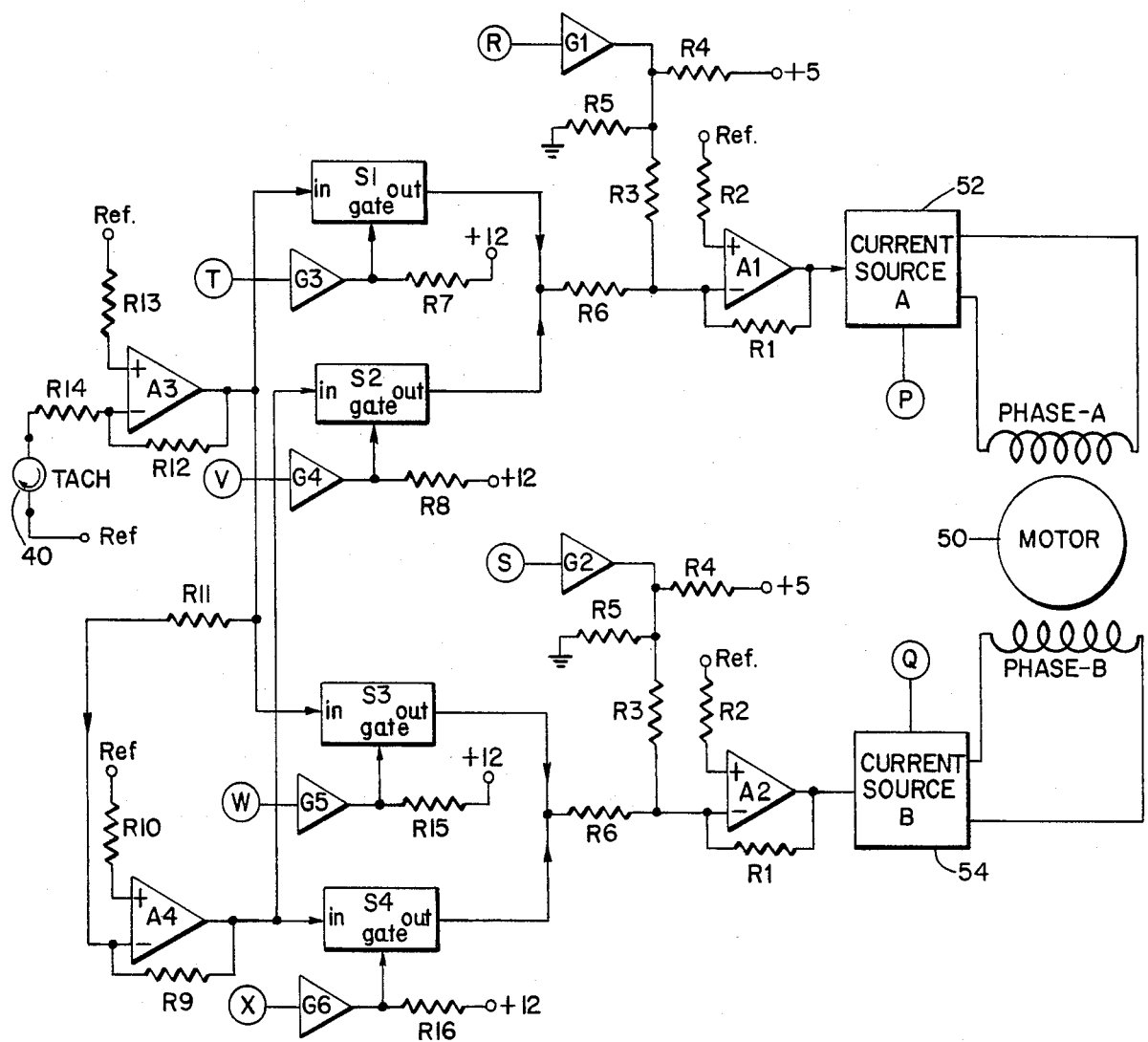
FIG. 9 is a schematic circuit diagram of another embodiment of a control circuit utilized for carrying out the quarter step operation in accordance with the present invention.

The particular stepper motor used in this 5.25 inch disk drive system was a size 23 2-phase bipolar motor with 400 full steps per revolution running at 0.4 A maximum continuous current per phase. The load inertia of the motor was 90 gmcm$^2$ and the motor stiffness was 90 mNm per degree on the quarter step. FIG. 9 shows a block diagram for the control circuit utilized in the disk drive system in accordance with the present invention. Current sources 52 and 54 supply current to phase windings A and B of the stator of stepper motor 50. Amplifiers A1 and A2 along with the associated resistors and the open collector gates G1 and G2 form the basic quarter step/velocity feedback control circuit for driving the stepper motor. Resistors R4 and R5 provide the voltage divider used in varying the current for generating the quarter step positions as discussed above. Input control signals P, Q, R and S provide the signals for varying the direction and magnitude of the current supplied to phase windings A and B of motor 50, as discussed above in conjunction with the circuit diagram of FIG. 7.

The output from tachometer 40 is amplified and inverted by amplifier A3 and fed to the analog switches S1 and S3. This signal from amplifier A3 also is fed to and inverted by amplifier A4 and the output from this amplifier is supplied to the analog switches S2 and S4. Thus, by suitable selection of switching signals T, V, W and X, either a positive or negative sign velocity error signal can be added into the quarter step voltage levels through resistor R6. Resistor R6 determines the gain of the feedback loop. This velocity feedback system is only effective within one step; the control circuit does not provide a velocity feedback signal while the motor is stepping.

Figure 13:
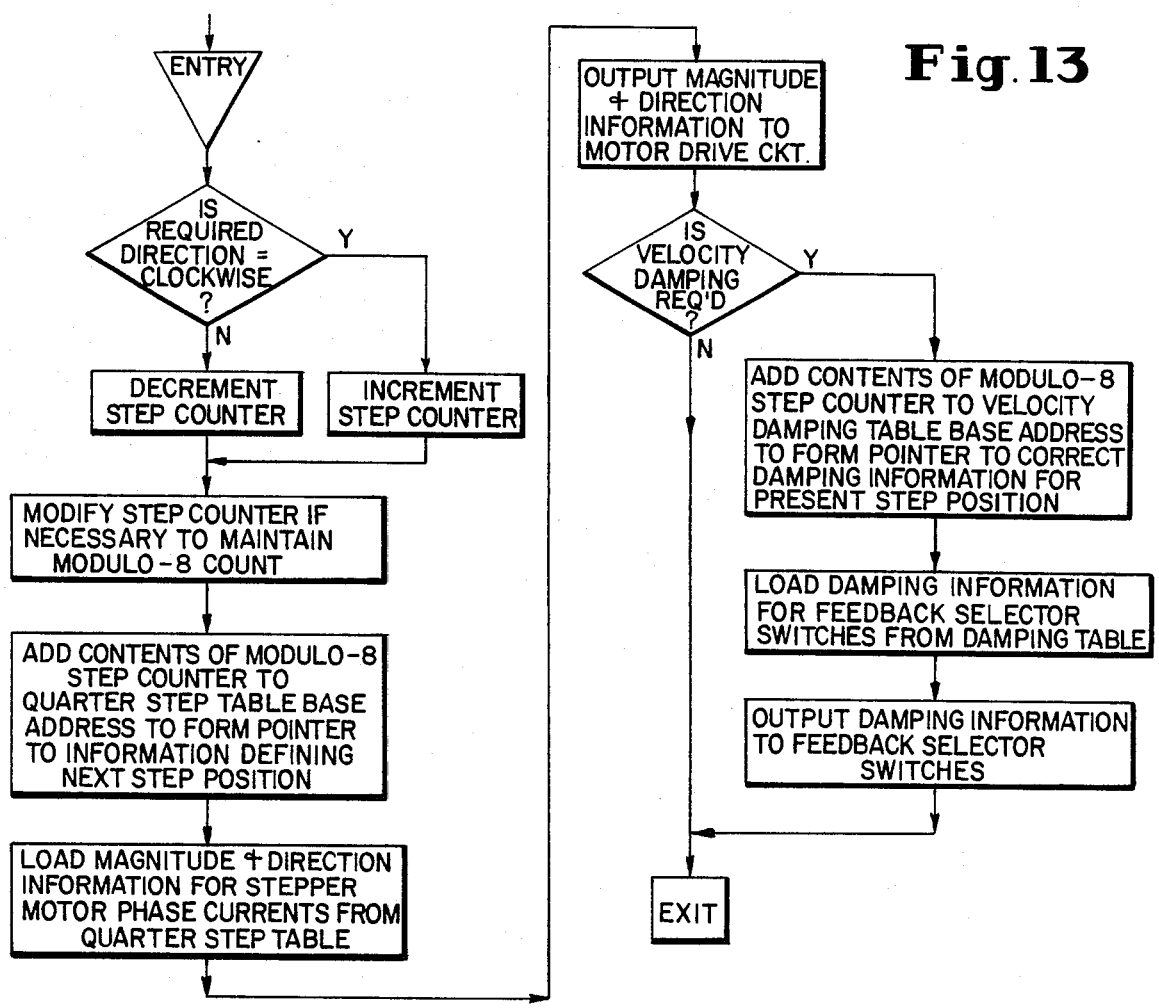
FIG. 13 is a flow chart of the program for controlling a microprocessor in carrying out the quarter step operation in accordance with the present invention.

Control signals P, Q, R, S, T, V, W and X are generated by an Intel 8749 microprocessor. The basic flow chart for the program in this microprocessor are show in FIG. 13. This microprocessor controls the sequencing of the phase and direction lines during stepping and the selection of velocity error signals during settling time. When the motor is stepping, P, Q, R and S (see Table II) define each step position and T, V, W and X (see Table III) are held low to turn all the feedback selector switches off. When the last step is reached, simultaneously with the last phase change on P, Q, R and S, the appropriate velocity feedback signal is selected for each motor phase via T, V, W and X.

TABLE II

| Quarter Step Magnitude and Direction Information Table | | | | |
|---|---|---|---|---|
| ADDRESS | DATA | | | |
| Phase Table Base Address | Bit 3 | Bit 2 | Bit 1 | Bit 0 |
| +0 | 1 | 0 | 1 | 1 |
| +1 | 0 | 0 | 1 | 1 |
| +2 | 0 | 1 | 1 | 0 |
| +3 | 0 | 1 | 0 | 0 |
| +4 | 0 | 0 | 0 | 1 |
| +5 | 1 | 0 | 0 | 1 |

TABLE II-continued

| Quarter Step Magnitude and Direction Information Table | | | | |
|---|---|---|---|---|
| ADDRESS | DATA | | | |
| Phase Table Base Address | Bit 3 | Bit 2 | Bit 1 | Bit 0 |
| +6 | 1 | 1 | 0 | 0 |
| +7 | 1 | 1 | 1 | 0 |

Data Bit 0 is Phase B Magnitude [S]  (0 = high current)
                                      (1 = low current)
Data Bit 1 is Phase B Current Direction [Q]
Data Bit 2 is Phase A Magnitude [R]  (0 = high current)
                                      (1 = low current)
Data Bit 3 is Phase A Current Direction [P]
(Accessed by Modulo - 8 Counter) (This pattern is repeated every 8 motor steps.)

TABLE III

| Damping Selector Table | | | | |
|---|---|---|---|---|
| ADDRESS | DATA | | | |
| Damping Table Base Address | Bit 3 | Bit 2 | Bit 1 | Bit 0 |
| +0 | 0 | 1 | 1 | 0 |
| +1 | 1 | 0 | 0 | 1 |
| +2 | 1 | 0 | 0 | 1 |
| +3 | 0 | 1 | 1 | 0 |
| +4 | 0 | 1 | 1 | 0 |
| +5 | 1 | 0 | 0 | 1 |
| +6 | 1 | 0 | 0 | 1 |
| +7 | 0 | 1 | 1 | 0 |

Data Bit 0 Links the Velocity Signal to Channel B [W]
Data Bit 1 Links the Velocity Signal to Channel B [X]
Data Bit 2 Links the Velocity Signal to Channel A [T]
Data Bit 3 Links the Velocity Signal to Channel A [V]
(Accessed by Modulo - 8 Step Counter). (This pattern is repeated every 8 motor steps.)

The correct feedback signal for each phase is determined from the direction of current flow in that phase and by the direction of motion of the motor. The maximum dynamic range used by the velocity error signal is +/− 0.6 V peak to peak at the inputs to the current sources. Thus with the quarter step positions being defined by a voltage of 5 V on one current source and 0.9 V on the other, 0.3 V minimum dynamic range overhead is available.

Maximum accuracy in positioning of the read/write head at the desired step loation is achieved with the quarter step mode of operation of the present invention because the static error due to frictional effects is identical for every step. Consequently the known technique of always approaching a given track from the same direction (the hysteresis correction step) can be employed to great effect. The required hysteresis correction is the same for all step positions and so, in theory, zero hysteresis is possible provided that the correct algorithm is designed into the microprocessor. In practice, this has proven to be almost the case with the quarter stepping mode of operation; hysteresis can be reduced from typically 15% when uncorrected to less than 2.5% on each step when a hysteresis correction step is employed. In contrast when utilizing the half stepping mode of operation of the motor, it invariably results in a higher hysteresis on the half step despite correction.

The resistors R4 and R5 can be selected such that the track separation is optimum and symmetrical over a motor cycle of eight steps. If the worst case of separation between the desired final resting location and actual location is defined as being the closest approach of two adjacent steps from any direction, then experiments show that this worst separation can be increased from typically 80% of nominal when half stepping to greater than 88% when quarter stepping, i.e. only a 12% distortion error with quarter stepping as compared to 20% when half stepping.

Since the velocity error signal now can be kept fully in the linear range of operation of the current sources, the system behaves as a classical second order system within the confines of one step. This means that critical damping can be achieved with considerable reductions in seek times for single and multiple track seeks. For a one track seek (one motor step), using quarter stepping has reduced the total seek time (including settling) from typically 10 ms in the half step mode to 5 ms. This improvement is derived purely from the elimination of non-linear effects present in the half step condition when the feedback signal approaches 0V.

Table IV shows the feedback selector signals output by the microprocessor for a full motor cycle. (Note that these states are only set up if the motor is required to stop on the step in question.)

TABLE IV

| Step Number | +A FEED BACK | −A FEED BACK | +B FEED BACK | −B FEED BACK |
|---|---|---|---|---|
| 1 | 0 | 1 | 1 | 0 |
| 2 | 1 | 0 | 0 | 1 |
| 3 | 1 | 0 | 0 | 1 |
| 4 | 0 | 1 | 1 | 0 |
| 5 | 0 | 1 | 1 | 0 |
| 6 | 1 | 0 | 0 | 1 |
| 7 | 1 | 0 | 0 | 1 |
| 8 | 0 | 1 | 1 | 0 |

Figure 10:
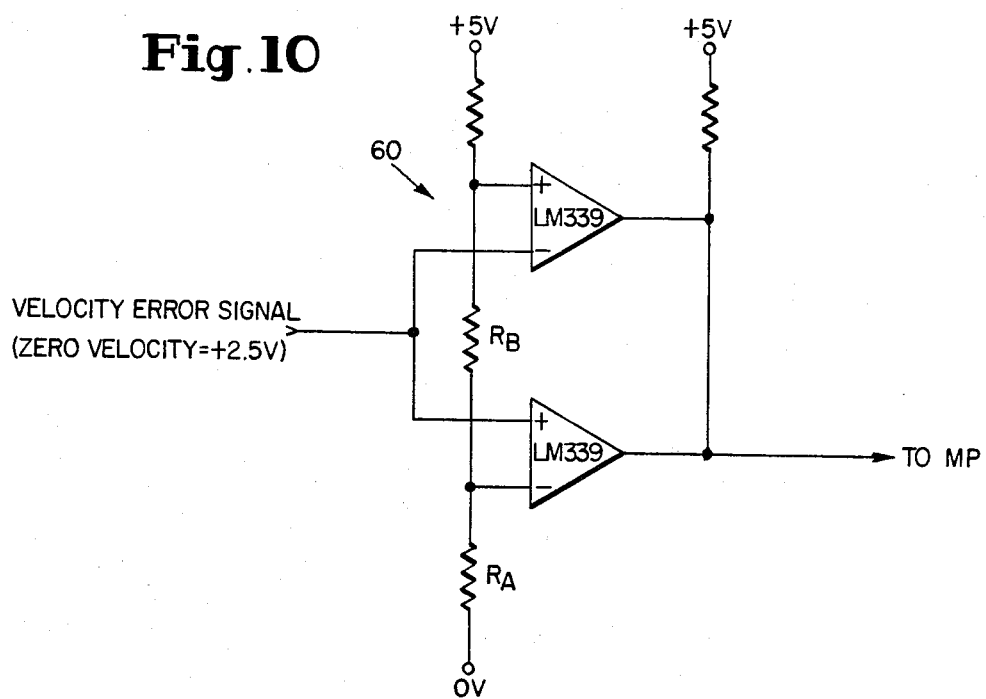
FIG. 10 is a schematic circuit diagram showing the portion of the control circuit for use in controlling the settling operation of the control arm during the stepping movement of such arm in accordance with the present invention.

This velocity error signal generated by the control microprocessor, as described above, can be used to determine when the control arm with the coupled read/write head is at rest after the settling time is complete. In order to accomplish this in accordance with the present invention, a window comparator 60, as shown in FIG. 10, is used to ascertain when the velocity error signal is within defined limits. The output of this comparator is fed to the processor (MP) where the excursions of the velocity signal outside the window are analyzed.

Figure 11:
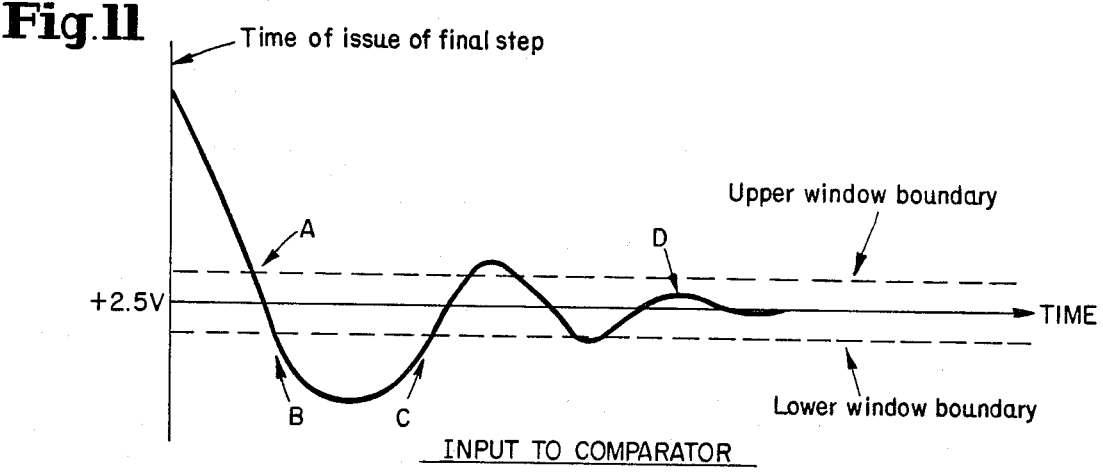
FIG. 11 is a wave diagram showing the varying voltage input signal resulting from detecting the velocity of the oscillation of the control arm as it settles to its rest position.
Figure 12:
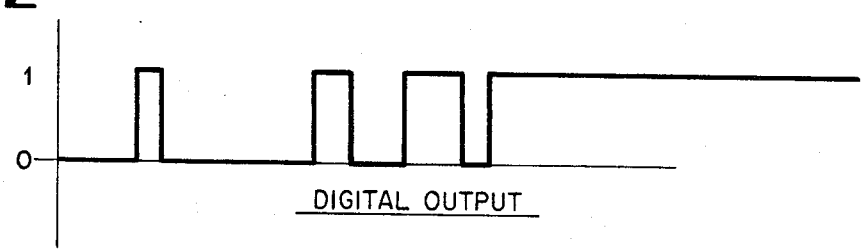
FIG. 12 is a wave diagram of the digital output signal from the comparator receiving the signal shown in FIG. 11 and utilized for controlling the settling operation of the control arm in accordance with the present invention.
Figure 14:
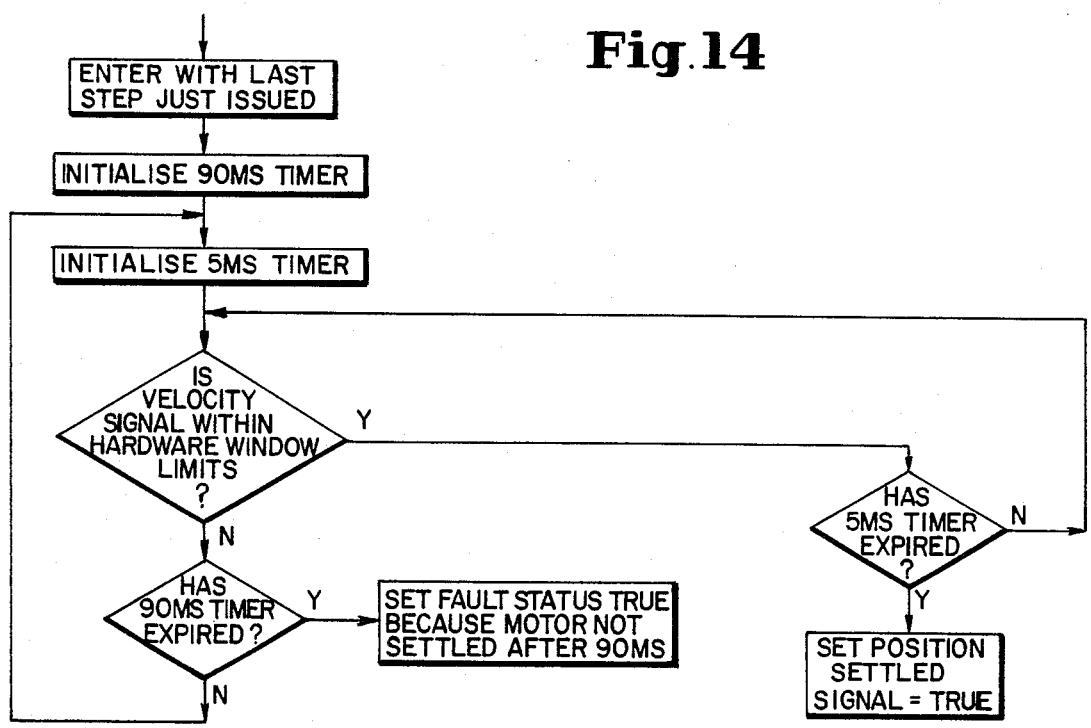
FIG. 14 is a flow chart of the program for controlling a microprocessor in carrying out the settling operation for the control arm in accordance with the present invention.

This analysis allows the microprocessor to indicate to the host computer the earliest possible moment when the data can be read off the disk. A flow chart of the program in the microprocessor is shown in FIG. 14. The analysis consists of initializing a software timer in the processor when the velocity error signal first enters the defined window (point A on the wave in FIG. 11). The period of this timer is set to be just greater than half the natural period of the actuating assembly. If the velocity signal subsequently leaves the window (point B on the wave in FIG. 11), then the timer is stopped and reinitialized again when the velocity signal re-enters the window (point C on the wave in FIG. 11).

This process is repeated until the timer has been restarted a large number of times without it being able to time out. If this situation rises then the velocity feedback circuitry is assumed to have failed and a fault condition is signalled. However, if the timer succeeds in expiring then this indicates that the previous velocity half cycle did not exceed the window limits and that the actuating assembly is nearly stationary (point D on the wave in FIG. 11). At this point the velocity will not be zero but will be less than a known value, i.e. the window boundaries. With this knowledge, the microprocessor then can be delayed for an additional fixed time period after which the actuating assembly is guaranteed to be settled.

This approach confers no advantage when the initial conditions for the last step are known, i.e. on a single step where the initial velocity conditions are zero. However, where multi-step movements of random length are involved (as in a disk drive actuating assembly), the initial conditions for the final step are variable and hence the final step response is unpredictable. Under these conditions, the adaptive settling of the present invention as described herein is able to judge precisely at what time the actuating assembly comes to rest thus optimizing the settling time for every seek. This optimizing process results in a reduction of 15 to 20% in the average access of time for a disk drive with 640 tracks.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. A stepper motor for use in controlling the operation data disk storage system, said stepper motor having a rotor and a stator, with the rotor being coupled to an output shaft, and comprising:
    first drive means for generating a first phase signal within the stator for creating a first drive force for rotating the rotor;
    second drive means for generating a second phase signal within the stator for creating a second drive force for rotating the rotor;
    control means for selectively providing positive and negative phase current signals to said first and second drive means for generating 8 stable step positions for the rotor during each motor cycle, said control means controlling the current supplied to said first and second drive means so that the resulting holding torque on the rotor generated by said first and second drive means is substantially the same at each step position.

2. A stepper motor according to claim 1 wherein said control means includes current supply means for selectively supplying high and low current signals to said first and second drive means so that the resulting holding torque on the rotor at each step position is substantially the same.

3. A stepper motor according to claim 2 wherein said control means generates stable quarter step positions lying between a normal half step position and a normal full step position generated when the magnitude of both current signals are substantially identical.

4. A stepper motor according to claim 3 wherein each quarter step position lies at 45° increments commencing at 22.5° of a full motor cycle.

5. A stepper motor according to claim 2 wherein said current supply means supplies a high current equal to X and a low current equal to $R_a/R_b X$ where $(R_a/R_b) < 1$ and is selected for optimizing the separation between each step location of a read/write arm coupled to the output shaft of the rotor as the arm moves across a data storage medium.

6. A stepper motor according to claim 5 wherein said current supply means includes means for maintaining the high and low currents and the relationship between such currents within predetermined limits so that the deviation between each actual step location of the read/write arm with the desired step location is minimized.

7. A stepper motor according to claim 2 further comprising: feedback control means for providing error feedback signals responsive to variances in the velocity of the movement of a control arm coupled to the output shaft of said stepper motor in order to assist in dampening any oscillation in the movement of the control arm as said stepper motor moves from its initial position to its final position and said current supply means being coupled to the output of said feedback control means so as to vary the current output of said current supply means in response to an error feedback signal while maintaining substantially linearity of the output signal from said current supply means.

8. A stepper motor according to claim 2 further comprising means for supplying 4 control data bits to said control means for controlling the operation of said control means for providing the 8 stable step positions wherein the different combinations of such 4 data bits are as follows:

| Step Positions | Bit 3 | Bit 2 | Bit 1 | Bit 0 |
| --- | --- | --- | --- | --- |
| 0 | 1 | 0 | 1 | 1 |
| 1 | 0 | 0 | 1 | 1 |
| 2 | 0 | 1 | 1 | 0 |
| 3 | 0 | 1 | 0 | 0 |
| 4 | 0 | 0 | 0 | 1 |
| 5 | 1 | 0 | 0 | 1 |
| 6 | 1 | 1 | 0 | 0 |
| 7 | 1 | 1 | 1 | 0 | where: data bit 3 sets the first phase current signal direction as positive or negative, data bit 2 sets the magnitude of the first phase current signal as high current or low current, data bit 1 sets the second phase current signal direction, and data bit 0 sets the magnitude of the second phase current signal as high current or low current.

9. A stepper motor according to claim 8 wherein each quarter step position lies at 45° increments commencing at 22.5° of a full motor cycle.

10. A stepper motor according to claim 8 wherein said current supply means supplies a high current equal to X and a low current equal to $(R_a/R_b) X$ where $(R_a/R_b) < 1$ and is selected for optimizing the separation between each step location of a read/write arm coupled to the output shaft of the rotor as the arm moves across a storage medium.

11. A stepper motor according to claim 9 wherein said current supply means includes means for maintaining the high and low currents and the relationship between such currents within predetermined limits so that the deviation between each actual step location of the read/write arm with the desired step location is less than approximately 12%.

12. A stepper motor control system for a data storage system, said control system including:
a control arm for movement of a read/write member across data storage tracks on a storage medium;
a two phase bipolar stepper motor having an output shaft coupled to said control arm for causing movement of said control arm;
said bipolar motor including: a rotor; a stator; first drive means for generating a first phase signal within the stator for creating a first drive force for rotating said rotor; second drive means for generating a second phase signal within the stator for creating a second drive force for rotating said rotor; control means for selectively providing positive and negative phase current signals to said first and second drive means for generating 8 stable step positions for the rotor during each motor cycle, said control means controlling the current supplied to said first and second drive means so that the resulting holding torque on said rotor generated by said first and second drive means is substantially the same at each step position.

13. A control system according to claim 12 wherein said control means includes current supply means for selectively supplying high and low current signals to said first and second drive means so that the resulting holding torque on said rotor at each step position is substantially the same.

14. A control system according to claim 13 wherein said control means generates stable quarter step positions lying between a normal half step position and a normal full step position generated when the magnitude of both current signals are substantially identical.

15. A control system according to claim 14 wherein each quarter step position lies at 45° increments commencing at 22.5° of a full motor cycle.

16. A control system according to claim 13 wherein said current supply means supplies a high current equal to X and a low current equal to $(R_a/R_b) X$ wherein $(R_a/R_b) < 1$ and is selected for optimizing the separation between each step location of a read/write arm coupled to said output shaft of said rotor as the arm moves across a data storage medium.

17. A control system according to claim 16 wherein said current supply means includes means for maintaining the high and low currents and the relationship between such currents within predetermined limits so that the deviation between each actual step location of the read/write arm with the desired step location is minimized.

18. A control system according to claim 13 further comprising: feedback control means for providing error feedback signals responsive to variances in the velocity of the movement of said control arm coupled to said output shaft of said stepper motor in order to assist in dampening any oscillation in the movement of said control arm as said stepper motor moves from its initial position to its final position and said current supply means being coupled to the output of said feedback control means so as to vary the current output of said current supply means in response to an error feedback signal while maintaining substantially linearity of the output signal from said current supply means.

19. A control system according to claim 13 further comprising means for supplying 4 control data bits to said control means for controlling the operation of said control means for providing the 8 stable step positions wherein the different combinations of such 4 data bits are as follows:

| Step Positions | Bit 3 | Bit 2 | Bit 1 | Bit 0 |
| --- | --- | --- | --- | --- |
| 0 | 1 | 0 | 1 | 1 |
| 1 | 0 | 0 | 1 | 1 |
| 2 | 0 | 1 | 1 | 0 |
| 3 | 0 | 1 | 0 | 0 |
| 4 | 0 | 0 | 0 | 1 |

| Step Positions | Bit 3 | Bit 2 | Bit 1 | Bit 0 |
|---|---|---|---|---|
| 5 | 1 | 0 | 0 | 1 |
| 6 | 1 | 1 | 0 | 0 |
| 7 | 1 | 1 | 1 | 0 | where: data bit 3 sets the first phase current signal direction as positive or negative, data bit 2 sets the magnitude of the first phase current signal as high current or low current, data bit 1 sets the second phase current signal direction, and data bit 0 sets the magnitude of the second phase current signal as high current or low current.

20. A control system according to claim 18 wherein each quarter step position lies at 45° increments commencing at 22.5° of a full motor cycle.

21. A control system according to claim 18 wherein said current supply means supplies a high current equal to X and a low current equal to $(R_a/R_b) X$ where $(R_a/R_b) < 1$ and is selected for optimizing the separation between each step location of a read/write arm coupled to said control arm that is coupled to said output shaft of the rotor as the read/write arm moves across a storage medium.

22. A control system according to claim 21 wherein said current supply means includes means for maintaining the high and low currents and the relationship between such currents within predetermined limits so that the deviation between each actual step location of the read/write arm with the desired step location is minimized.

23. A control system for controlling the settling of a control arm coupled to a read/write member as such arm is stepped from one position to another, said control system including:

velocity detection means for detecting movement of the control arm and for providing an oscillating output velocity signal at its output in response to such movement;

comparison means coupled to the output of said velocity detection means for determining if the oscillating output velocity signal falls within preselected velocity signal limits;

timing means for comparing a measured time period during which the oscillating output velocity signal falls within the preselected velocity signal limits with a preset time period and providing an output timing signal at its output when the measured time period equals the preset time period;

reinitiating means for reinitiating said timing means if the oscillating output velocity signal exceeds the preselected velocity signal limits so that said timing means restarts the timing of such output signal at zero; and, output control means coupled to the output of said timing means for generating an output control signal indicating that the control arm is substantially at rest when an output timing signal is received.

24. A control system according to claim 23 wherein said velocity detection means provides an oscillating output voltage signal the magnitude of which varies with the oscillatin of the control arm about a resting location when the control arm is moved from one position to another with the magnitude of such output voltage signal decreasing as the control arm comes to rest.

25. A control system according to claim 24 wherein said comparison means provides a voltage signal envelope with upper and lower limits and provides an output signal when the output voltage signal received from said velocity detection means is within such limits.

26. A control system according to claim 25 wherein said timing means and said reinitiating means cooperate to generate an output timing signal when the output voltage signal from said velocity detection means has remained between the upper and lower limits of said comparison for a preset time period.

* * * * *

UNITED STATES PATENT AND TRADEMARK OFFICE
CERTIFICATE OF CORRECTION

PATENT NO. : 4,518,904
DATED : May 21, 1985
INVENTOR(S) : Nigel MacLeod and David Ruxton It is certified that error appears in the above—identified patent and that said Letters Patent is hereby corrected as shown below:

Column 18, line 25, change "oscillatin" to --oscillation--.

Signed and Sealed this

Twenty-sixth Day of November 1985

[SEAL]

Attest:

Attesting Officer

DONALD J. QUIGG

Commissioner of Patents and Trademarks